United States Patent
Ando et al.

(10) Patent No.: US 8,725,410 B2
(45) Date of Patent: May 13, 2014

(54) NAVIGATION APPARATUS FOR MOTORCYCLE

(75) Inventors: Masakuni Ando, Saitama (JP); Koichi Shimamura, Saitama (JP); Kentaro Ikegami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 500 days.

(21) Appl. No.: 12/461,473

(22) Filed: Aug. 12, 2009

(65) Prior Publication Data

US 2010/0082249 A1 Apr. 1, 2010

(30) Foreign Application Priority Data

Sep. 30, 2008 (JP) ................................. 2008-254921

(51) Int. Cl.
*G01C 21/00* (2006.01)

(52) U.S. Cl.
USPC ........... 701/423; 701/400; 701/408; 701/409; 701/411; 345/156

(58) Field of Classification Search
USPC ........... 701/200, 208, 209, 211, 532; 345/156
See application file for complete search history.

(56) References Cited

U.S. PATENT DOCUMENTS

| | | | | |
|---|---|---|---|---|
| 6,157,890 A * | 12/2000 | Nakai et al. | | 701/408 |
| 6,249,744 B1 * | 6/2001 | Morita | | 701/487 |
| 6,484,092 B2 * | 11/2002 | Seibel | | 701/465 |
| 6,614,419 B1 * | 9/2003 | May | | 345/156 |
| 6,714,863 B2 * | 3/2004 | Katayama et al. | | 701/428 |
| 6,792,350 B2 * | 9/2004 | Katayama et al. | | 701/533 |
| 6,845,324 B2 * | 1/2005 | Smith | | 702/3 |
| 6,950,743 B2 * | 9/2005 | Kainuma et al. | | 701/532 |
| 6,958,707 B1 * | 10/2005 | Siegel | | 340/902 |
| 7,596,448 B2 * | 9/2009 | Suzuki et al. | | 701/444 |
| 2004/0135722 A1 * | 7/2004 | Takahashi | | 342/357.06 |
| 2004/0158389 A1 * | 8/2004 | Shibata et al. | | 701/200 |
| 2008/0201074 A1 * | 8/2008 | Bleckman et al. | | 701/211 |
| 2010/0082249 A1 * | 4/2010 | Ando et al. | | 701/211 |
| 2011/0040480 A1 * | 2/2011 | Tebbutt | | 701/211 |

FOREIGN PATENT DOCUMENTS

| | | |
|---|---|---|
| JP | 09-095276 | 4/1997 |
| JP | 2002168632 | 6/2002 |
| JP | 2005207977 | 8/2005 |
| JP | 2006103379 | 4/2006 |
| JP | 2008145217 | 6/2008 |
| JP | 2008185614 | 8/2008 |

\* cited by examiner

*Primary Examiner* — Thomas Black
*Assistant Examiner* — Wae Louie
(74) *Attorney, Agent, or Firm* — Squire Sanders (US) LLP

(57) ABSTRACT

Provided is a motorcycle navigation apparatus that receives broadcasts from a satellite radio mounted on a motorcycle. The motorcycle navigation apparatus includes a controller, monitor and a screen switching unit. The controller is configured to control the navigation apparatus. The a monitor configured to provide, when said satellite radio receives a warning, a notification that information has been received by said satellite radio. The screen switching unit configured to switch said navigation screen to a screen that corresponds to the received information when an operator executes a predetermined operation on the controller, wherein the predetermined operation is executed upon receipt of said notification.

20 Claims, 8 Drawing Sheets

NAVIGATION APPARATUS FOR MOTORCYCLE

FIELD

Embodiments of the invention relate to a motorcycle navigation apparatus capable of indicating a destination and a current vehicle position and, more particularly, to a navigation apparatus that can effectively use information received from a satellite radio mounted on a motorcycle.

BACKGROUND

For motorcycle navigation apparatuses, an apparatus integrally incorporates a navigation display section (or a navigation screen) and operation switches (or an operation section). The apparatus is mounted on an installment panel of the motorcycle as shown in Japanese Patent Laid-open No. Hei 9-95276 (hereinafter "Patent Document 1").

A navigation apparatus is an apparatus in which a navigation display section (or the navigation screen) is mounted at a center position of a handlebar. The center position of the handlebar is operationally attached to the chassis of a motorcycle. A map screen is displayed on this navigation screen to assist the user to navigate on the road to a destination set by the user.

Related-art road navigation with navigation apparatuses is executed by detecting the position of a vehicle by a satellite positioning system based on a global positioning system (GPS) and executing computation processing based on the detection. However, if a change occurs in weather or road conditions, the related-art road navigation cannot take changing conditions into consideration.

Hence, when a motorcycle operator wants to know the weather conditions of a destination while driving, the operator can listen to weather information on a radio-broadcast. Especially, in the case of driving a motorcycle, which has no roof, the operator is easily affected by the weather. This can cause the operator to obtain information about the weather up to a destination before beginning his or her journey.

Therefore, such a navigation apparatus has been desired as effectively using various kinds of information without interfering with the navigation capabilities by capturing the information about weather and road conditions received by a satellite radio.

SUMMARY

According to an embodiment of the invention, a motorcycle navigation apparatus is configured to receive broadcasts from a satellite radio mounted on a motorcycle. The motorcycle navigation apparatus includes a controller, a monitor and a screen switching unit. The controller is configured to control the navigation apparatus. When the satellite radio receives a warning, the monitor provides a notification that information has been received by the satellite radio. The screen switching unit is configured to switch the navigation screen to a screen that corresponds to the received information when an operator executes a predetermined operation on the controller. The predetermined operation is executed upon receipt of the notification.

According to an embodiment of the invention, a motorcycle navigation apparatus is configured to receive broadcasts from a satellite radio mounted on a motorcycle. A controlling means is provided for controlling the navigation apparatus. The motorcycle navigation apparatus includes a monitoring means for providing, when the satellite radio receives a warning, a notification that information has been received by the satellite radio. The motorcycle navigation apparatus also includes a screen switching means for switching a navigation screen to another screen that corresponds to the received information when an operator executes a predetermined operation on the controlling means. The predetermined operation is configured to be executed upon receipt of the notification.

According to an embodiment of the invention, a motorcycle navigation method for receiving broadcasts from a satellite radio mounted on a motorcycle. The method includes transmitting, by a monitor, a notification that information has been received by the satellite radio when the satellite radio receives information about a warning. The method also include switching, by the screen switching unit, the navigation screen to a screen that corresponds to the received information when a predetermined operation is executed on a controller. The predetermined operation is executed upon receipt of the notification.

DESCRIPTION OF THE PREFERRED EMBODIMENTS

The following describes some embodiments of the invention to carry out a motorcycle navigation apparatus (hereafter referred to as a "navigation apparatus") with reference to drawings.

Figure 1:
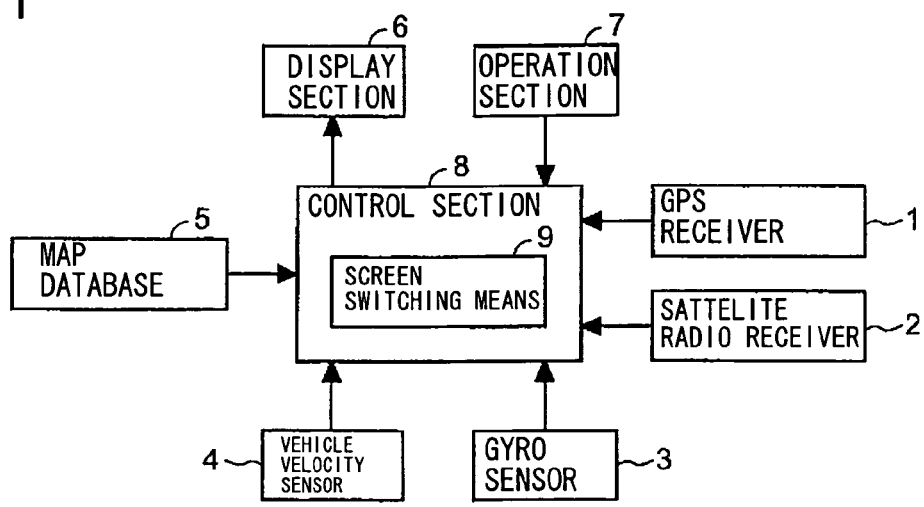
FIG. 1 is a block diagram illustrating a motorcycle navigation apparatus in accordance with an embodiment of the invention.
Figure 2:
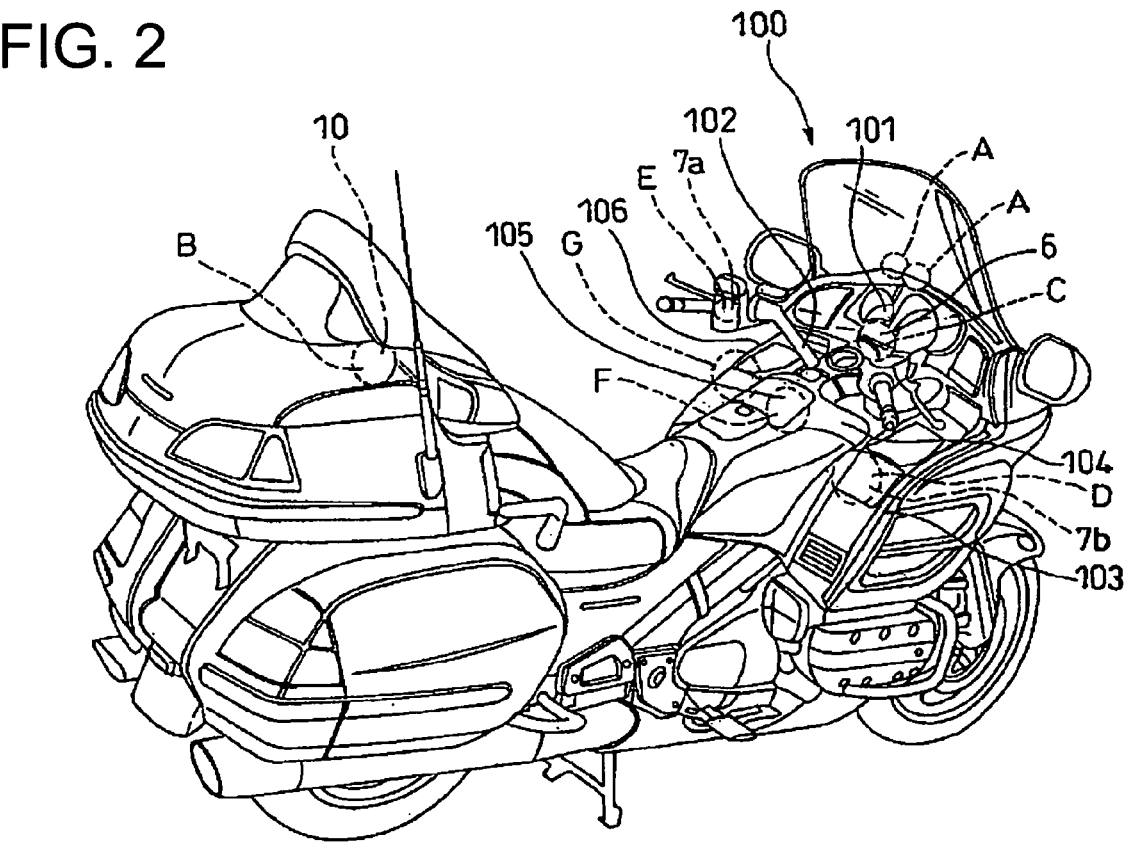
FIG. 2 is a perspective view of a motorcycle include the motor cycle navigation apparatus in accordance with an embodiment of the invention.

FIG. 1 illustrates a functional section diagram showing the navigation apparatus according to an embodiment of the invention. FIG. 2 is an external view of a motorcycle 100 on which the navigation apparatus can be mounted.

The navigation apparatus can include a GPS receiver 1 as a component of a satellite positioning system a satellite radio receiver 2, a vehicle velocity sensor 4, and a map database 5. The navigation apparatus can also include a navigation display 6, an operation section 7, and a control section 8. The satellite radio receiver 2 can receive a broadcast from satellite radio. The gyro sensor 3 can serve as a component of an inertial positioning system and the vehicle velocity sensor 4 can detect vehicle velocities of the motorcycle 100. The map database 5 can match a map and can generate a guide map. The navigation display section (or a navigation screen) 6 is configured by a liquid crystal display that can display a guide map. The operation section 7 can be configured by operation switches to execute various operations for the navigation apparatus. The control section 8 is based on a microcomputer for executing the computation processing of the satellite positioning system and the inertial positioning system. In this embodiment, the control section 8 can also control the entire navigation apparatus.

In the GPS receiver 1, the current position of the motorcycle can be estimated in real-time by the satellite positioning system, which receives a signal from the GPS. The satellite radio receiver 2 can be configured to receive a warning signal associated with weather information or road information, such as traffic jams, when or during the normal broadcasting of a music program by a satellite radio.

As compared with the terrestrial wave radio that is divided for regions, the satellite radio can be broadcast by, for example, XM Satellite Radio Corporation in U.S., which can be heard in the areas covering the U.S. For example, when an operator drives from an eastern portion of the U.S. to a western portion of the U.S., in order for the operator to continuously hear programs, the satellite radio can be used to broadcast to mobile bodies, such as motorcycles and automobiles. Further, in the satellite radio broadcasting, weather information and traffic jam information can be provided through satellite data communication. Simultaneously, various kinds of warning information can also be originated.

In this embodiment, the GPS receiver 1 and the satellite radio receiver 2 are installed at position A in front of a meter display section 101. The meter display section 101 can display drive information, such as vehicle velocity and travel distance, on the motorcycle 100.

With the gyro sensor 3, the inertial positioning system can be configured to have a direction sensor to detect the direction and travel distance of the motorcycle 100. This can allow an accurate indication of a current position along with the use of the positional information based on the above-mentioned GPS signal.

The vehicle velocity sensor 4 can obtain a distance signal in accordance with a travel distance of the motorcycle 100 based on the number of wheel rotations. This allows, for example, the velocity of the motorcycle to be detected. The map database 5 can read information recorded on a recording media such as HDD, DVD-ROM, or CD-ROM. The map database 5 can also generate a map for guide map display onto the navigation display section 6 and is accommodated in position B in the rear of the motorcycle 100 as configuring a navigation apparatus main 10 along with the control section 8. The control section 8 can be configured to control the entire navigation apparatus.

The control section 8 can receive signals from the GPS receiver 1, gyro sensor 3, and the vehicle velocity sensor 4 to execute computation processing thereon. The control section 8 can match the position of the vehicle with the map obtained from the map database 5 to display a matching result on the navigation display section 6. The control section 8, upon reception of warning information by the satellite radio receiver 2, can display the information about the warning reception onto a part of the navigation display section 6. The control section 8 can have a screen switching means or unit 9. In this embodiment, the screen switching unit 9 is configured to switch the screen of the navigation display section 6 to a screen that corresponds to the received information of warning. This occurs, for example, upon a predetermined operation by the operator through the operation section 7.

The navigation display section 6 configured by a liquid crystal display for example is mounted at position C under the meter display section 101. Such a configuration, for example, can make it easier for the operator to see. The navigation display section 6 can also include a monitor section that provides the information, which can indicate that a warning has been received when the warning was received by the satellite radio.

The operation section 7 through which the operator executes various operations to the navigation apparatus can be installed into a first operation section 7a and a second operation section 7b. For example, the first operation section 7a can execute a screen switching operation and a volume control operation while the second operation section 7b can execute an initial setting input. In particular, the first operation section 7a can be mounted at position E inside the left-side grip of a handlebar 102, which allows the operator to operate while grasping the handlebar 102. The second operation section 7b is mounted at position D inside the right-side cowl 103.

The first operation section 7a can include a control for executing a screen switching operation of the navigation display section 6 when a warning signal is received. The first operation section 7a can be attached at a position that allows the operator to execute the operation while grasping the handlebar 102.

Also, an audio unit (component) 105 can be mounted for reproducing, for example, radio, an MD, or a CD. The audio unit 105 can be attached at a position F in front of a fuel tank 104 mounted on the motorcycle 100. For audio unit 105, various operations, such as sound source and volume control, can be executed through audio panel switches arranged at position G inside a left-side cowl 106.

In this embodiment, the reproduction and operation of various sound sources executed on the audio unit 105 are displayed by replacing the map screen with a music reproduction screen or on the navigation display section 6.

Figure 3:
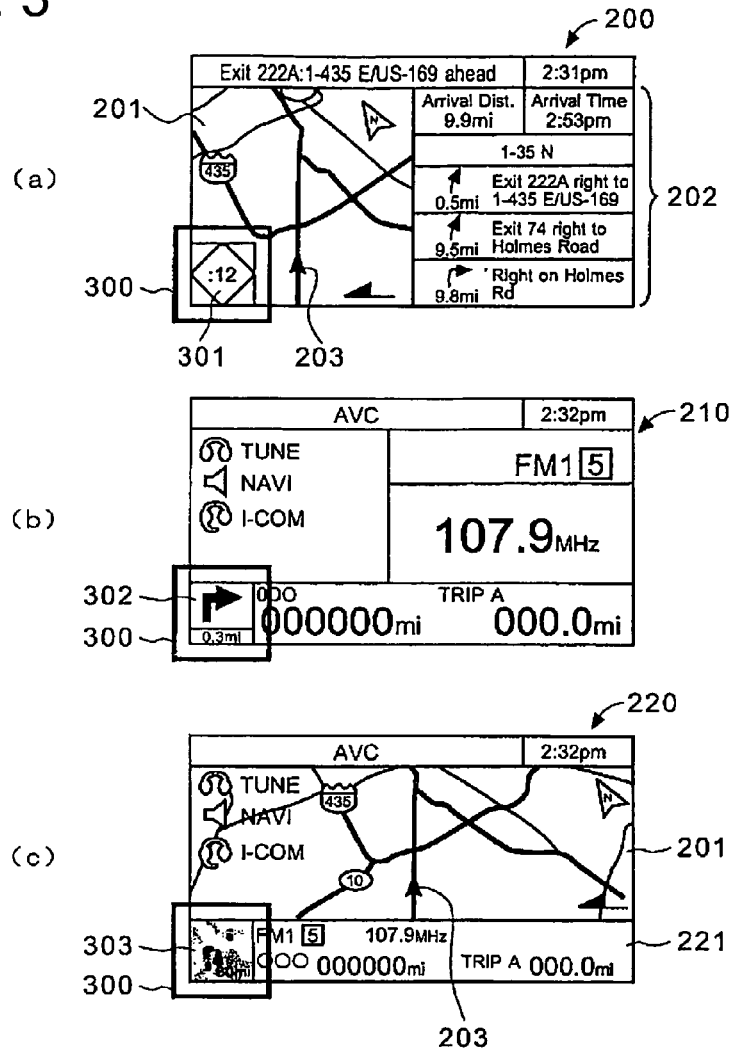
FIGS. 3(a) through 3(c) are display screens indicative of a navigation display section of the motorcycle navigation apparatus in accordance with an embodiment of the invention.

Examples of screens to be displayed on the navigation display section 6 of the motorcycle navigation apparatus according to an embodiment of the invention are shown in FIG. 3(a) through 3(c). FIG. 3(a) shows a map navigation screen 200 where road navigation can be executed by the navigation apparatus. The road navigation screen 200 displays, for example to the left, a road map 201 around the current position where the motorcycle is located. The road navigation screen 200 can also display, for example to the right, navigation information 202. The navigation information 202 can include information such as distance to destination, arrival time, straight, turn-to-right, turn-to-left, etc. The navigation information 202 shows turn display for navigating, in the navigation to destination, the nearest three turn-to-right or turn-to-left positions. The road map 201 shows, for example, a pointer 203 that indicates a direction and position of the travel of the motorcycle.

FIG. 3(b) shows a music reproduction screen 210 that can check the reproduction and operation situations of various sound sources for the audio unit installed on the motorcycle, in accordance with an embodiment of the invention. On this screen, devices such as, an FM radio is displayed.

FIG. 3(c) shows a map and music information mixed screen 220 on which a map screen and a music screen can be displayed together. Music reproduction information 221 can be displayed, for example, in the lower side. The road map 201 displayed in the center of the screen can show a pointer 203. The pointer 203 can indicate, for example, a direction of travel and a position of the motorcycle.

The road navigation screen 200, the music reproduction screen 210, the map and music information mixed screen 220, and the road map 201, which can be displayed on the entire navigation display section 6 are sequentially switched by pressing a display switch (not shown). The display switch can be arranged under the navigation display section 6.

When warning (or warning information) of the satellite radio has been received by the satellite radio receiver 2, the information about the type of the received warning is displayed on a monitor section 300. The monitor section 300, for example, is arranged in the lower left corner of the screen of the navigation display section (the navigation screen) 6. In this embodiment, the satellite radio receiver 2 identifies the type of the warning information being received and outputs an identification result to the control section 8. In accordance with the type of the information, the control section 8 displays an icon corresponding to the received warning information onto the monitor section 300 in the screens shown in FIGS. 3(a) through 3(c).

The information transmitted by the satellite radio broadcasting is road information, weather information, and information for navigating the course of the motorcycle. In accordance with the types of warning, different icons are displayed on the monitor section 300.

In this embodiment, warning display 301 shown on the monitor section 300, as shown in FIG. 3(a), indicates road conditions and a delay time estimated from the road conditions. The delay time can be, for example, displayed in numerical values.

Warning display 302 can be shown on the monitor section 300, as shown in FIG. 3(b). For example, the warning display 302 is associated with navigation information, which can be indicative of arrows. The arrows can indicate of turn-to-right and turn-to-left and the distance to that point.

Warning display 303 can be shown on the monitor section 300, as shown in FIG. 3(c). The warning display 303 can be associated with weather information to show a weather map of the area around the motorcycle in a reduced size.

The road information can indicate near-by road conditions, such as traffic jams and traffic accidents, up to the destination, while the navigation apparatus can navigate the motorcycle to the destination. The weather information can indicate the precipitation, wind conditions, and the forming of waterspouts in the area around the motorcycle. The navigation information can be information associated with turn points, such as turn-to-right and turn-to-left, at the time of the route navigation by the navigation apparatus. The weather information can also include earthquake information and wildfire information.

When the operator executes a predetermined operation (a specific operation will be described later) through a control of the first operation section 7a in response to the notification of warning from the monitor section 300, the control section 8 receives a signal generated by this operation and the screen switching means 9 switches the screen displayed on the navigation display section 6 to a screen corresponding to the information received at the time of warning. The screen corresponding to the information received at the time of warning can be supplied from the satellite radio broadcasting, which can be the information about the warning screen received by the satellite radio receiver 2.

Figure 4:
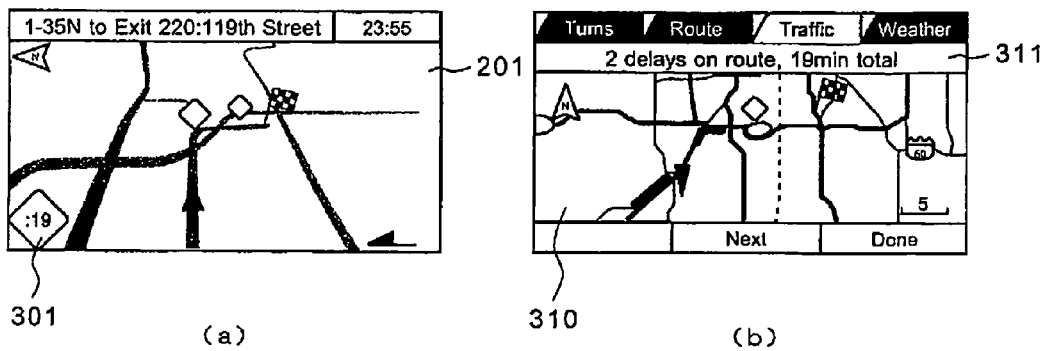
FIGS. 4(a) through 4(b) are display screens indicative of switching from a map screen to a warning screen (road conditions) in accordance with an embodiment of the invention.

To be more specific, when a predetermined operation is executed through a control of the first operation section 7a, a road map 201 (FIG. 4(a)) with the road condition warning display 301 displayed on the monitor section 300, can be switched to a warning screen 310 (FIG. 4(b)) with the road conditions of surrounding positions displayed. On the warning screen 310, information about locations of traffic jam can be displayed on the map screen and, at the same time, a delay time to the destination can also be displayed in an upper section 311.

Figure 5:
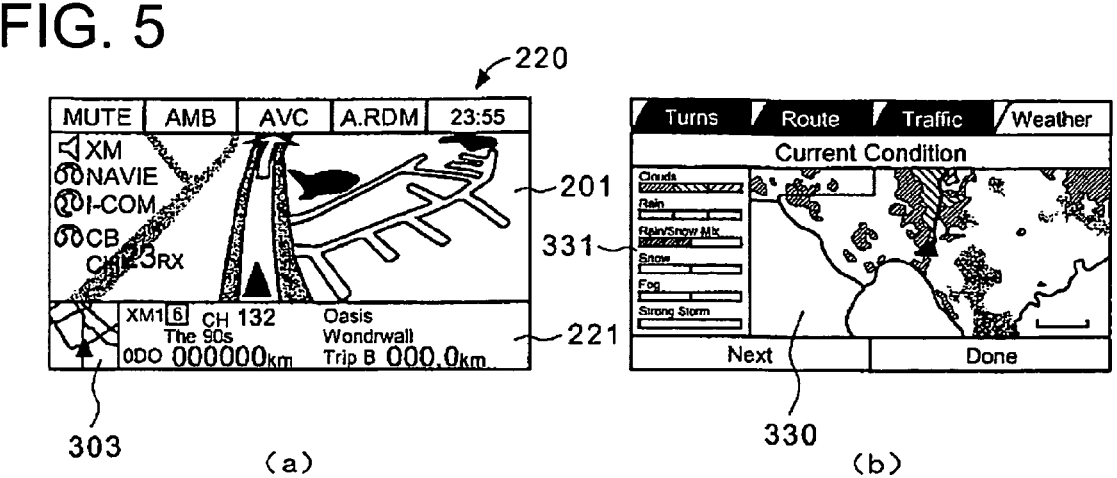
FIGS. 5(a) and 5(b) are display screens indicative of switching from a map and music information mixed screen to a warning screen (weather information) in accordance with another embodiment of the invention.

Also, the map and music information mixed screen 220 (FIG. 5(a)) with warning display 303 of weather conditions displayed on the monitor section 300, can be switched to a warning screen 330 (FIG. 5(b)) with the weather conditions around the motorcycle displayed. On the warning screen 330, information about rain falling in regions can be displayed along with the map screen. Also on the warning screen 330, information about the degrees of cloud, rain, snow, fog, and storm can be displayed in left-side section 331.

Therefore, the motorcycle operator is able to perform route changes to the destination by judging road conditions and weather conditions from the warning screens.

Figure 6:
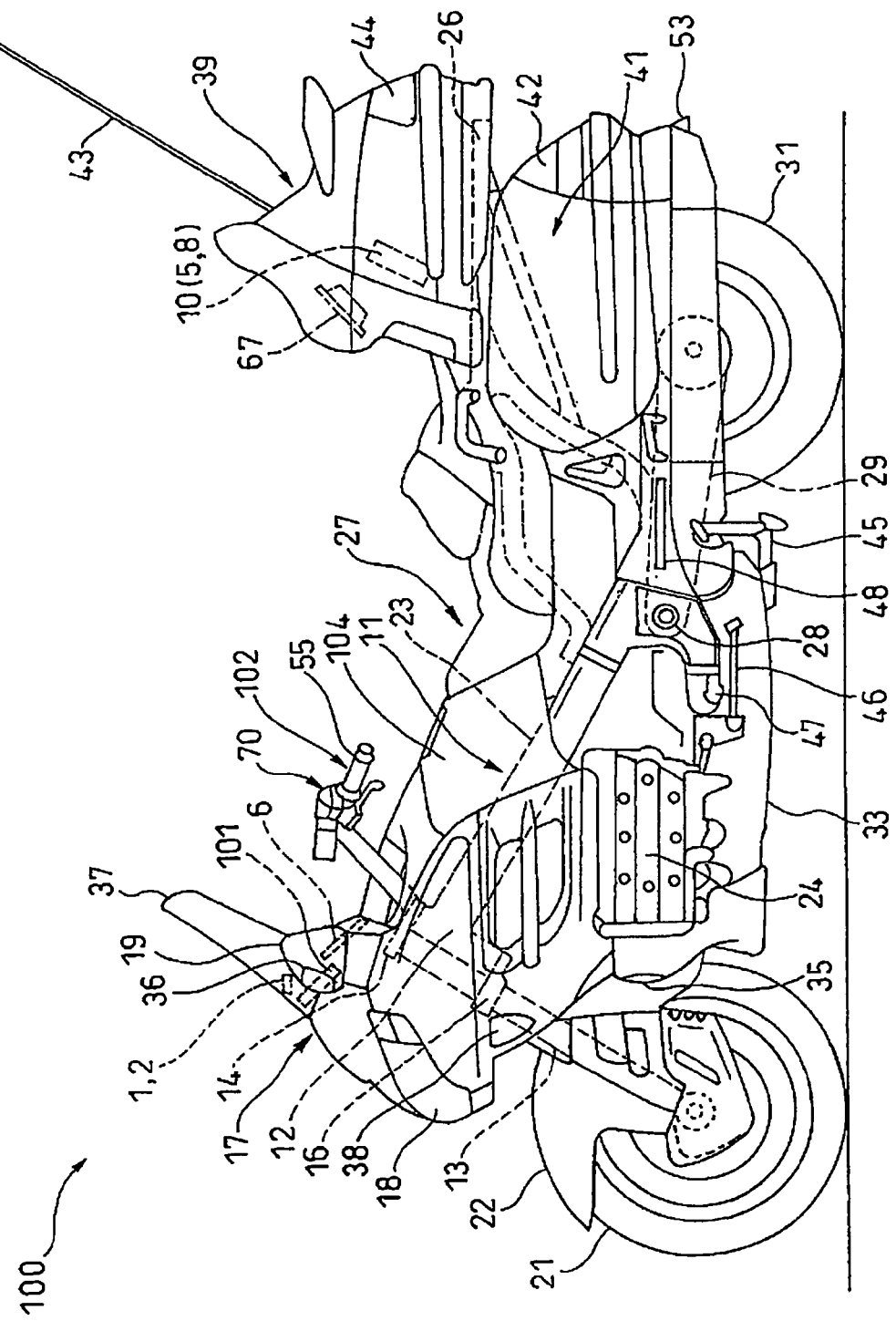
FIG. 6 is side view of a motorcycle using the navigation apparatus in accordance with an embodiment of the invention.
Figure 7:
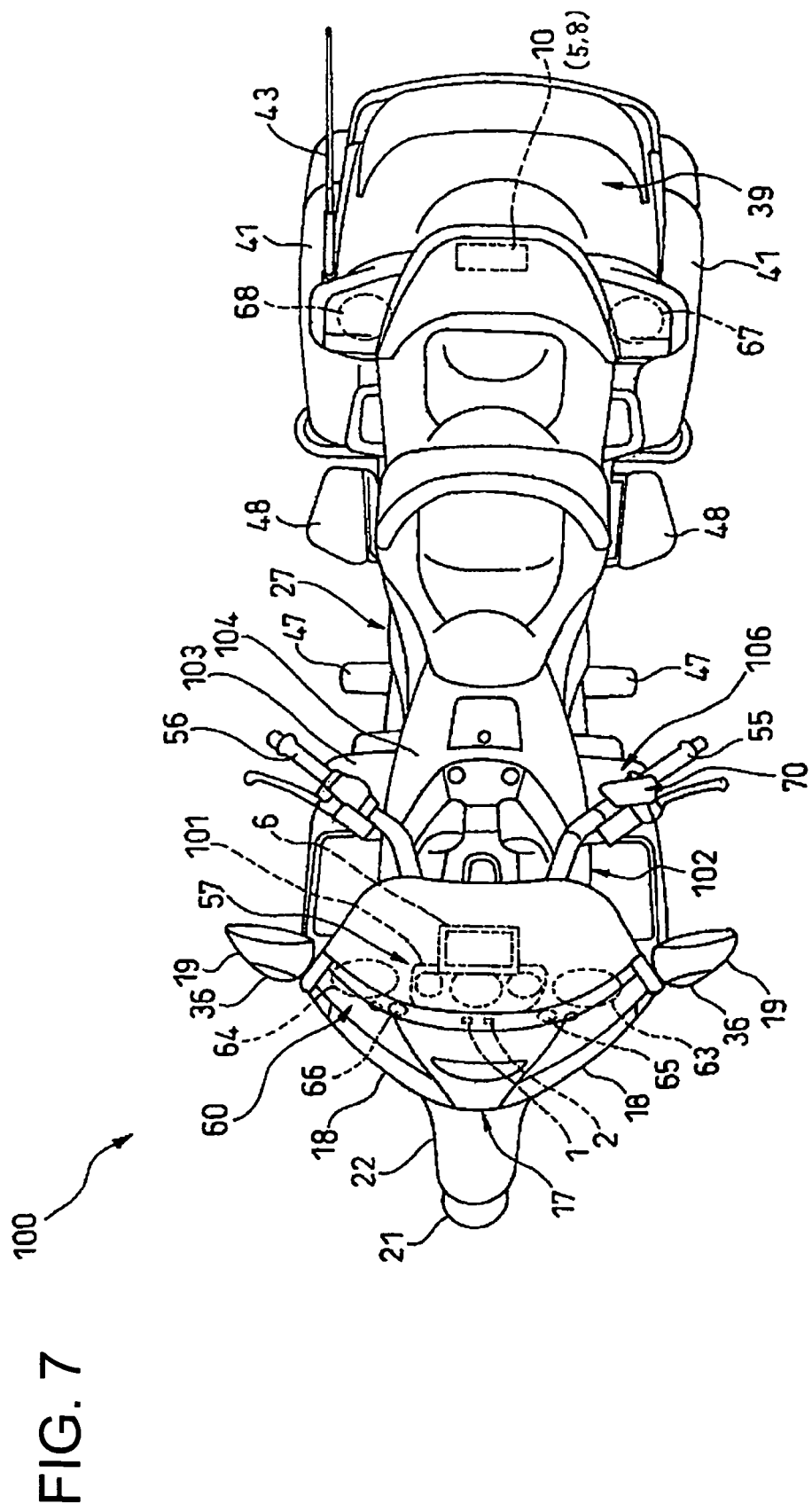
FIG. 7 is top view of the motorcycle using the navigation apparatus in accordance with an embodiment of the invention.

FIG. 6 and FIG. 7 are a side view and a top view of a motorcycle having the navigation apparatus in accordance with an embodiment of the invention.

A motorcycle 100 has a configuration in which a vehicle body frame (a vehicle body) 11 is mounted with a head pipe 12. The head pipe can be operationally mounted with a front fork 13 with a top bridge 14 of the front fork 13 being mounted with a handlebar 102. A fairing 17 can be arranged in front of the top bridge 14 and a bottom bridge 16 with headlights 18, 18 arranged in front of the fairing 17 with left-side and right side mirrors 19, 19. A front wheel 21 is mounted, for example, under the front fork 13 and is covered with a front fender 22. A main frame 23 of the vehicle body frame 11 extends from the head pipe 12 to the rear side, which allows an engine 24 to be mounted under this main frame 23. A fuel tank 25 is arranged on top of the main frame 23 and a seat rail 26 is extended from the main frame 23 to the rear side. In this embodiment, a vehicle seat 27 is attached to seat rail 26 and a rear swing arm 29 is extended from the lower rear side of the main frame 23 via a pivot 28. A rear wheel 31 is rotatively mounted to the read end of this rear swing arm 29 and a rear cushion (not shown) is arranged between the rear side of the rear swing arm 29 and the vehicle body frame 11. A muffler 53 is mounted under the vehicle body.

Above a meter panel (an instrument panel) 57 of the motorcycle 100, the GPS receiver 1 and the satellite radio receiver 2 can be arranged. Also, the GPS receiver 1 can be configured by a chip antenna, a patch antenna, or a helical antenna that can be incorporated in the meter panel (the instrument panel) 57 or the fairing 17.

In this embodiment, the motorcycle includes an undercover 33, which protects the lower side of the vehicle. The motorcycle includes fog lamps 35 and front turn signals 36 to indicate turn-to-left or turn-to-right. The motorcycle has a wind screen 37 and an air opening 38 provided in the fairing 17. As a result, the air opening 38 can supply air to the engine 24. A trunk box 39 and a saddle bag 41 can be provided to accommodate baggage. Rear blinkers 42 can be provided to indicate turn-to-left or turn-to-right and a rod antenna 43 can be provided to receive FM radio broadcasting. Tail lamps 44 can be used when driving at night. The motorcycle can also have a main stand 45, a sub stand 46, operator steps 47, and passenger steps 48.

Figure 8:
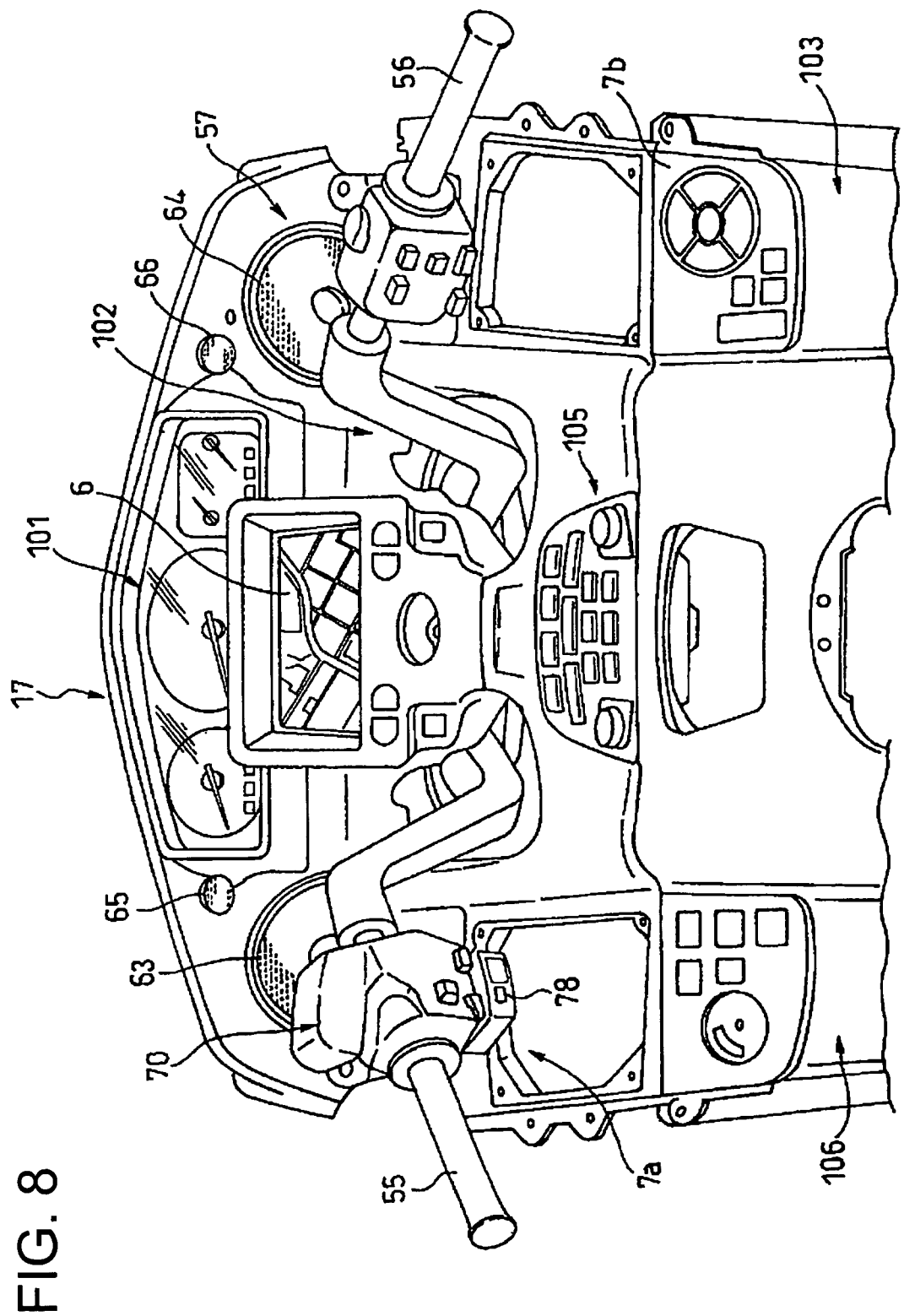
FIG. 8 is a perspective view of the motorcycle navigation apparatus in accordance with an embodiment of the invention.

In this embodiment, an audio apparatus 60 can be mounted on the motorcycle 100, as shown in FIG. 8. Audio apparatus 60 can have left-side middle and low tone units 63, 64 which are configured to reproduce middle and low tones. The tone units 63, 64 are arranged to the left of the meter display section (the vehicle meter) 101. A left-side high tone unit 65 can provided for reproducing a high tone, and can be arranged between the meter display section 101 and the left-side middle and low tone unit 63. A right-side high tone unit 66 can be provided, which can reproduce a high tone, and can be arranged between the meter display section 101 and the right-side middle and low tone unit 64. Left-side and right-side deep low tone units (deep low tone speakers) 67, 68 are provided, and can reproduce a frequency range lower than the middle and low unit 63, 64, and can be arranged in the trunk box 39. An audio unit 105 can be provided to make units 63 through 68 generate reproduced sound. Audio unit 105 can also be configured by audio equipment that has, for example, FM and AM tuners, a CD deck, an MD deck, a cassette deck, an amplifier, and other capabilities.

FIG. 8 illustrates the motorcycle navigation apparatus practiced in accordance with an embodiment of the invention. Navigation display section 6 can be arranged in the rear of the meter display section 101, and the operation section 7 (the first operation section 7a and the second operation section 7b) can be configured around the handlebar 102 and the cowl (the upper panel) 103. The navigation main body (or the control unit) 10 together with the control section 8 and the map database 5 can be accommodated in the trunk box 39.

On both ends of the handlebar 102, a left-side handle grip 55 and a right-side handle grip 56 are mounted. To the left of the handlebar 102, a handle switch box 70 arranged with controls to be operated during driving can be arranged as the first operation section 7a.

The operation section 7 can be configured by the first operation section 7a and the second operation section 7b. The first operation section 7a being arranged as the handle switch box 70 provides a portion that can be operated during driving. In addition, the second operation section 7b being attached to the cowl 103 provides a portion that can be operated while the motorcycle is stopped.

In this embodiment, the first operation section 7a is arranged in the neighbor of the left-side handle grip 55 to allow the operator to operate the navigation apparatus 100 without unlinking his hand from the handlebar 102. This can enhance the operability of the navigation apparatus 100.

Figure 9:
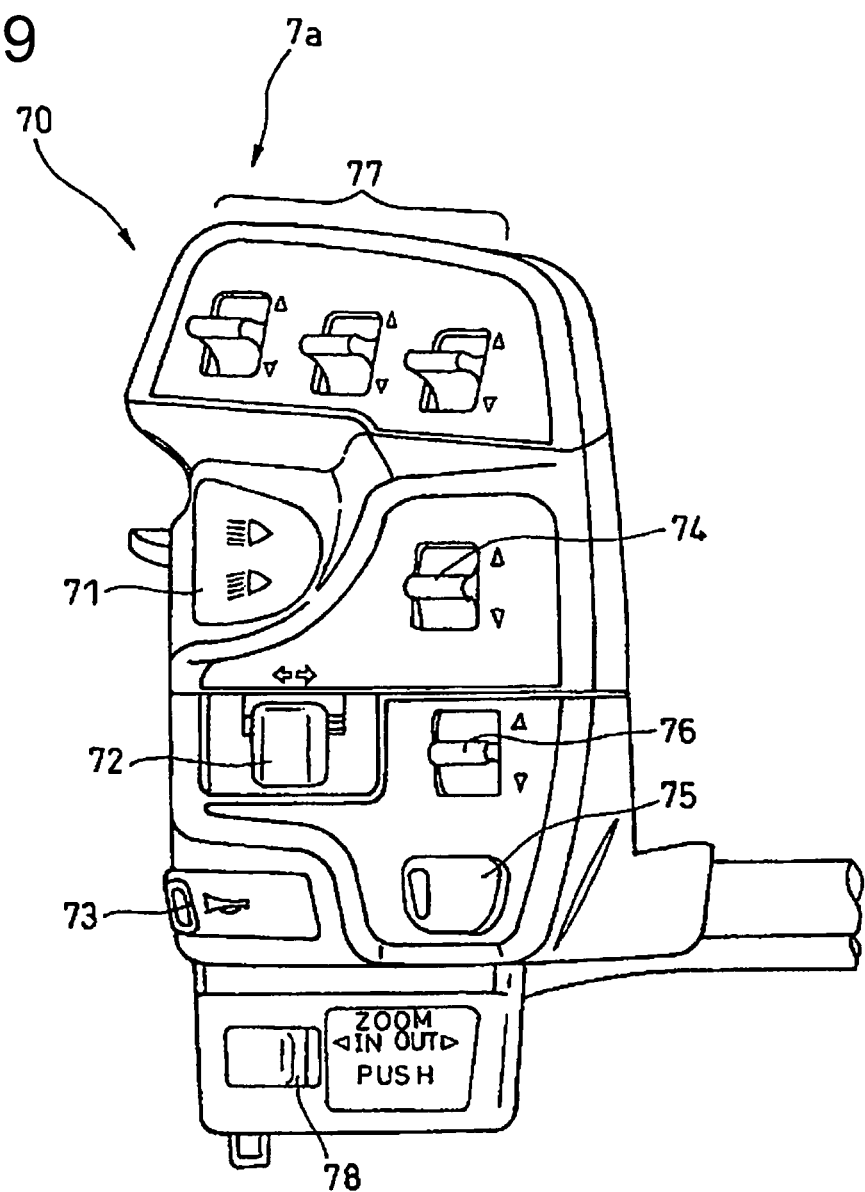
FIG. 9 is a front view of a first operation section (a handle switch box) of a motorcycle using the navigation apparatus in accordance with an embodiment of the invention.

The following describes, an example of a configuration of the handle switch box 70 that can operate as the first operation section 7a with reference to FIG. 9.

In this embodiment, the handle switch box 70 is mounted in the neighbor of the thumb-side of the left-side handle grip 55, which is mounted on the handlebar 102. The handle switch box 70 (the first operation section 7a) is configured by arranging operations buttons and operation levers to be operated during driving in a box. In particular, the handle switch box 70 can be configured by a light operation button 71 for turning on/off the head lights 18, 18, the tail lamps 44, 44, etc. The handle switch box 70 includes a blinker slide knob 72 for operating the left-side and right-side front blinkers 36, 36 and the left-side and right-side rear blinkers 42, 42. Also provided can be a horn switch button 73 for sounding a horn (not shown) and a volume lever 74 for controlling the volume of the audio unit 105 or the navigation apparatus 100. The handle switch box 70 can also include a mute button 75 for temporarily muting the volume of the navigation apparatus 100. A tuning/disc button 76 can also be provided for tuning in on broadcasting stations or selecting track numbers of a CD, for example, in the audio unit 105. The handle switch box 70 can also include an amateur radio levers 77 for operating the amateur radio (not shown). The handle switch box 70 can include a control 78 for switching between the screens of the navigation display section 6. The control 78 has functions of a screen selector switch, a screen zoom-in/zoom-out switch, and a voice re-guide switch that are used for operating the navigation apparatus during driving. In particular, the control 78 can be a switch for multiple operations. For example, turning this control to the left side (short pressing) displays a map on the navigation display section 6 in a zoom-in manner. Turning this control to the right side can display the map on the navigation display section 6 in a zoom-out manner. At the time of receiving warning of the satellite radio receiver 2, turning this control long to the left side (long pressing) can switch the map screen (FIG. 4(a) and FIG. 5(a)), for example, displayed on the navigation display section 6 to the warning screen (FIG. 4(b) and FIG. 5(b)), and turning this control long to the right side (long pressing) can return the warning screen displayed on the navigation display section 6 to the original screen.

In addition, pushing the control 78 forward (a push operation) repeats voice guide (re-guide or re-announcement). The voice guide denotes capabilities of voice announcement that the motorcycle is approaching a railroad crossing or the destination, for example.

According to the above-mentioned configuration of the first operation section 7a (the handle switch box 70), the control 78 can be arranged on the first operation section 7a to switch a screen to be displayed on the navigation display section 6 to a warning screen. This way, if a warning display is displayed on the monitor section 300 while driving, the operator can instantaneously execute an operation of switching to a warning screen by long pressing the control 78 to the left side. This can allow quick and effective use the information displayed on the warning screen, thereby enhancing usability of the navigation apparatus.

Figure 10:
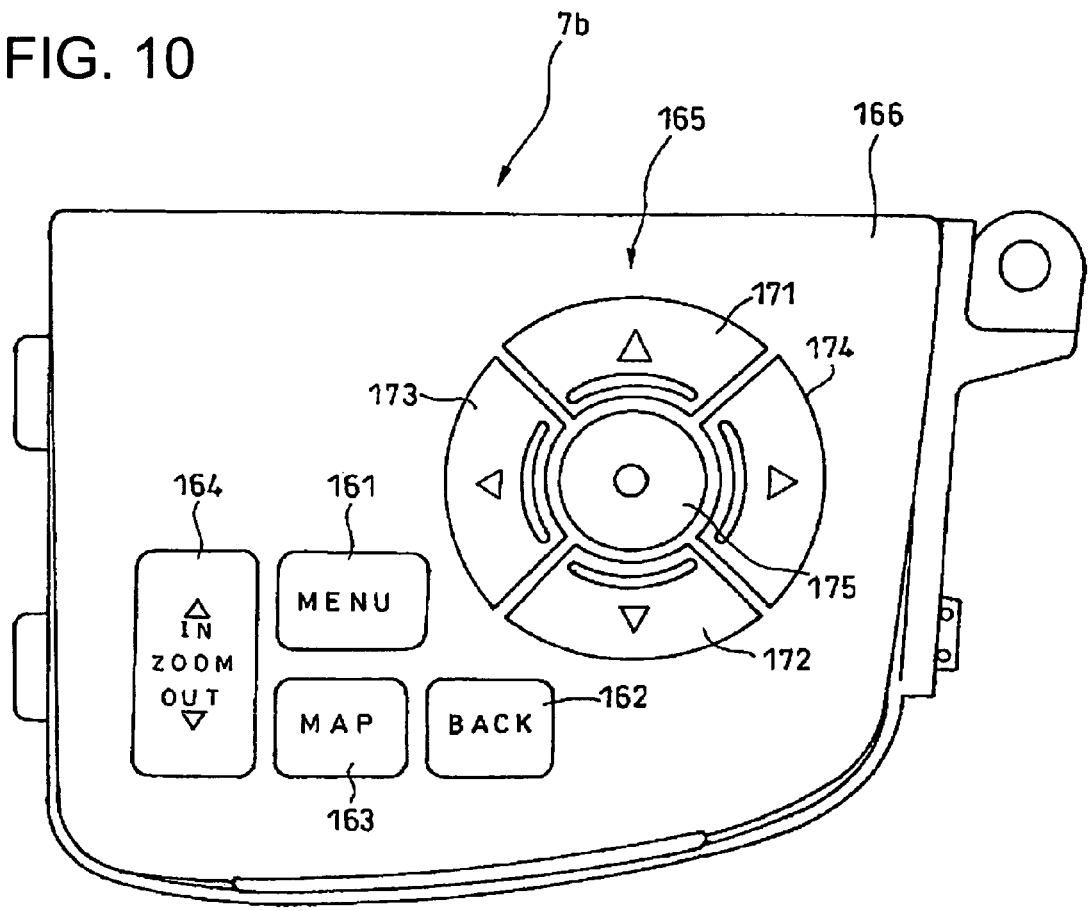
FIG. 10 is a top view of a second operation section of the motorcycle navigation apparatus in accordance with an embodiment of the invention.

Referring to FIG. 10, there is shown a top view of the second operation section 7b of the motor cycle navigation apparatus in accordance with an embodiment of the invention.

In this embodiment, the second operation section 7b is an operation portion arranged with buttons to be operated when the motorcycle is stopped. Also provided can be a menu button 161 for displaying various settings and a cancel button 162 for canceling selected contents. A map button 163 for displaying a highway road map or a street map and a button 164 for zooming in/out a map displayed by the map button 163 can be provided.

A selection enter button 165 can be provided for entering the selection of a menu or a map displayed by the menu button 162 or the map button 163, and an operation panel 166 can be arranged with these buttons 161 through 165.

Also, the selection enter button 165 is configured by selection buttons 171 through 174 for selecting a menu or a map and an enter button 175 for entering the selected menu or map.

According to the above-mentioned configuration of the second operation section 7b, the zoom-in (detail screen) and zoom-out (wide screen) operations of map display on the navigation display section 6 can be executed by turning the control 78 of the first operation section 7a to the left side or to the right side (short pressing). The zoom-in and zoom-out operations can also be executed by pressing the upper section or the lower section of the button 164 of the second operation section 7b. As a result, the operator can find it easier to execute selected operations based on situations.

According to the above-mentioned navigation apparatus, when a warning is received by the satellite radio receiver 2, the warning information is displayed on the monitor section 300. The monitor section 300 can be a part of the navigation display section (the navigation screen) 6 so that the navigation screen cannot be quickly switched to warning. This can prevent the navigation function from being intervened without the intention of the user (the operator).

Further, when the user, upon confirming the navigation screen, which cannot yet be switched to warning, long presses the control 78 of the first operation section 7a mounted on the handlebar 102 to enter his intention of displaying warning, the display of a map on the navigation display section 6 can be quickly switched to a warning screen. As a result, the user can easily obtain various kinds of warning information in accordance with the kinds of warning from the displayed warning screen.

In accordance with an embodiment of the invention, a motorcycle navigation apparatus is provided. The motorcycle navigation apparatus can receive a satellite radio, which can be mounted on a motorcycle. The motorcycle navigation apparatus includes a control for the navigation apparatus, which can be arranged on a handlebar of the motorcycle. In this embodiment, a monitor section provides a notification that, when the satellite radio has received warning, the information has been received. The monitor section can be arranged on one part of a navigation screen of the navigation apparatus. A screen switching unit switches the navigation screen to a screen, which corresponds to the information received at warning, when a operator executes a predetermined operation on the control upon the notification.

In accordance with another embodiment of the invention, the received information is at least one of road information, weather information, and navigation information. The information can navigate a course of the motorcycle as a second characteristic.

According to another embodiment of the invention, the road information indicates surrounding road conditions up to a destination while the navigation apparatus navigates the motorcycle to the destination.

According to another embodiment of the invention, the weather information is information about rain precipitation and wind conditions.

According to another embodiment of the invention, the navigation information is turn point information at the time of route navigation.

According to another embodiment of the invention, when the satellite radio receives warning during the driving of the motorcycle, information that the warning has been received is displayed on the monitor section. The monitor section can be a part of the navigation screen of the navigation apparatus so that the navigation screen cannot be quickly switched to a warning screen. This can prevent the navigation function from being interfered regardless of user intention. This also allows a screen, which corresponds to the information received at warning, to be switched by the operator's execution of a predetermined operation on the control. As a result, the operator can check the contents of the warning only by entering his intention.

According to another embodiment of the invention, the information to be displayed on the screen selected by the screen switching unit is at least one of road information, weather information, and navigation information. The information can navigate a course of the motorcycle. This can allow the operator to reset routes to the destination with reference to this type of information.

According to another embodiment of the invention, the road information relates to the surrounding road conditions up to the destination. This can allow the operator to obtain traffic jam information up to the destination.

According to another embodiment of the invention, the weather information relates to the information about rain precipitation and wind conditions. This can allow the operator, when driving, to take this type of information into consideration.

According to another embodiment of the invention, the navigation information relates to turn point information at the time of route navigation. This can allow the operator drive based on this information.

DESCRIPTION OF REFERENCE SYMBOLS

1 . . . GPS receiver,
2 . . . Satellite radio receiver,
3 . . . Gyro sensor,
4 . . . Vehicle velocity sensor,
5 . . . Map database,
6 . . . Navigation display section (navigation screen),
7 . . . Operation section, 7a . . . First operation section, 7b . . . Second operation section,
8 . . . Control section,
9 . . . Screen switching means (or unit),
10 . . . Navigator main,
11 . . . Vehicle body frame (vehicle body),
55 . . . Left-side handle grip,
56 . . . Right-side handle grip,
70 . . . Handle switch box,
78 . . . Control, 100 . . . Motorcycle,
101 . . . Meter display section,
102 . . . Handlebar,
103 . . . Cowl,
104 . . . Fuel tank,
105 . . . Audio unit,
106 . . . Cowl,
200 . . . Map navigation screen,
201 . . . Road map,
210 . . . Music reproducing screen,
220 . . . Map and music information mixed screen,
300 . . . Monitor section,
301, 302, 303 . . . Warning display, and
310, 330 . . . Warning screen.

We claim:

1. A motorcycle navigation apparatus configured to receive broadcasts from a satellite radio mounted on a motorcycle, the motorcycle navigation apparatus comprising:
   a controller configured to control said navigation apparatus;
   a monitor configured to provide, when said satellite radio receives a warning, a notification that information has been received by said satellite radio,
   wherein the satellite radio is configured to identify a type of the warning being received and output an identification result for the type of warning to the controller, and wherein the notification comprises an icon corresponding to the identification result; and
   a screen switching unit configured to switch said monitor to a screen that corresponds to the received information when an operator executes a predetermined operation on said controller, wherein the predetermined operation is executed upon receipt of said notification.

2. The motorcycle navigation apparatus according to claim 1, wherein the received information relates to at least one of road information, weather information, and navigation information for navigating a course for said motorcycle.

3. The motorcycle navigation apparatus according to claim 2, wherein said road information relates to surrounding road conditions up to a destination while said navigation apparatus navigates said motorcycle to said destination.

4. The motorcycle navigation apparatus according to claim 2, wherein said weather information relates to information about rain precipitation and wind conditions.

5. The motorcycle navigation apparatus according to claim 2, wherein said navigation information relates to turn point information at the time of route navigation by said navigation apparatus.

6. The motorcycle navigation apparatus according to claim 1, further comprising:
a control comprising a screen selector switch and a screen zoom-in/zoom-out switch.

7. The motorcycle navigation apparatus according to claim 6, wherein short pressing the control to a left side zooms-in on a map displayed on the monitor, and wherein turning the control to a right side zooms-out on the map displayed on the monitor.

8. The motorcycle navigation apparatus according to claim 6, wherein long pressing the control to a left side switches a map screen displayed on the monitor to a warning screen and long pressing the control to a right side switches the warning screen displayed on the monitor back to the map screen.

9. A motorcycle navigation apparatus configured to receive broadcasts from a satellite radio mounted on a motorcycle, the motorcycle navigation apparatus comprising:
a controlling means for controlling said navigation apparatus;
a monitoring means for providing, when said satellite radio receives a warning, a notification that information has been received by said satellite radio,
wherein the satellite radio comprises identifying means for identifying a type of the warning being received and outputting means for outputting an identification result for the type of warning to the controller, and wherein the notification comprises an icon corresponding to the identification result; and
a screen switching means for switching the monitoring means to another screen that corresponds to the received information when an operator executes a predetermined operation on a controlling means, wherein the predetermined operation is executed upon receipt of said notification.

10. The motorcycle navigation apparatus according to claim 9, wherein the received information relates to at least one of road information, weather information, and navigation information for navigating a course for said motorcycle.

11. The motorcycle navigation apparatus according to claim 10, wherein said road information relates to surrounding road conditions up to a destination while said navigation apparatus navigates said motorcycle to said destination.

12. The motorcycle navigation apparatus according to claim 9, wherein said weather information relates to information about rain precipitation and wind conditions.

13. The motorcycle navigation apparatus according to claim 9, wherein said navigation information relates to turn point information at the time of route navigation by said navigation apparatus.

14. A motorcycle navigation method for receiving broadcasts from a satellite radio mounted on a motorcycle, comprising:
transmitting, by a monitor, a notification that information has been received by said satellite radio when said satellite radio receives information about a warning;
identifying, by the satellite radio, a type of the warning being received and outputting an identification result for the type of warning to the monitor, and wherein the notification comprises an icon corresponding to the identification result; and
switching, by a screen switching unit, a navigation screen to a screen that corresponds to the received information when a predetermined operation is executed on a controller, wherein the predetermined operation is executed upon receipt of said notification.

15. The motorcycle navigation method according to claim 14, further comprising:
configuring the received information to relate to at least one of road information, weather information, and navigation information for navigating a course of said motorcycle.

16. The motorcycle navigation method according to claim 15, further comprising:
configuring said road information to relate to surrounding road conditions up to a destination while said navigation apparatus navigates said motorcycle to said destination.

17. The motorcycle navigation method according to claim 15, further comprising:
configuring said weather information to relate to information about rain precipitation and wind conditions.

18. The motorcycle navigation method according to claim 15, further comprising:
configuring said navigation information to relate to turn point information at the time of route navigation by said navigation apparatus.

19. The motorcycle navigation method according to claim 14, further comprising:
short pressing a control to a left side to zoom-in on a map displayed on the monitor; and
turning the control to a right side to zoom-out on the map displayed on the monitor.

20. The motorcycle navigation method according to claim 14, further comprising:
long pressing a control to a left side switches a map screen displayed on the monitor to a warning screen and long pressing the control to a right side switches the warning screen displayed on the monitor back to the map screen.

* * * * *